United States Patent [19]

Fraula et al.

[11] 4,212,239

[45] Jul. 15, 1980

[54] METHOD AND APPARATUS FOR REMOVING MOISTURE FROM WET PULP

[75] Inventors: Louis F. Fraula, Troy; Gary V. Hoying, Sidney, both of Ohio

[73] Assignee: Hobart Corporation, Troy, Ohio

[21] Appl. No.: 12,464

[22] Filed: Feb. 15, 1979

[51] Int. Cl.[2] .......................... A47J 19/02; B30B 3/00

[52] U.S. Cl. .......................................... 100/37; 100/117; 100/144

[58] Field of Search ........................ 100/37, 41, 43, 72, 100/117, 144–150; 241/73, 74

[56] References Cited

U.S. PATENT DOCUMENTS

| | | | |
|---|---|---|---|
| 3,062,129 | 11/1962 | Wandel | 100/43 |
| 3,188,942 | 6/1965 | Wandel | 100/117 X |
| 3,191,872 | 6/1965 | Dyson | 100/117 X |
| 3,319,897 | 5/1967 | Craig et al. | 100/117 UX |
| 3,375,776 | 4/1968 | Dyson | 100/72 |
| 3,394,649 | 7/1968 | Kemper et al. | 100/43 |
| 3,426,677 | 2/1969 | Combs et al. | 100/117 |
| 3,688,687 | 9/1972 | Craig et al. | 100/117 |

OTHER PUBLICATIONS

Hobart Instruction Manual for Models: EL5-1224, EL-7-1530 and EL7-1536 Waste Equipment Systems. Rev. 8-76, Hobart Corporation, Troy Ohio.

*Primary Examiner*—Leonard D. Christian

[57] ABSTRACT

An improved method and apparatus is provided to control the moisture content of pulp which is discharged from a press. During operation of the press, slurry containing the pulp enters the press and engages a screw which is rotated to feed the pulp upwardly in the press. As the wet pulp moves upwardly, water is removed from the pulp. In order to further reduce the moisture content of the pulp, a restrictor member or cone in the press outlet is effective to compress the pulp against helical flighting of the screw. In order to maintain the moisture content of the discharged pulp substantially constant with variations in wet pulp consistency and to prevent overloading of the press drive motor, the restrictor cone is movable axially along the screw drive shaft to vary the extent to which it restricts the press outlet. The restrictor cone is moved along the screw drive shaft under the influence of forces applied against the outer surface of the cone by the wet pulp. This movement of the cone adjusts the extent to which the outlet from the press is restricted and the extent to which the wet pulp is compressed with variations in the consistency of the wet pulp.

24 Claims, 7 Drawing Figures

METHOD AND APPARATUS FOR REMOVING MOISTURE FROM WET PULP

BACKGROUND OF THE INVENTION

The present invention relates to a new and improved method and apparatus for removing moisture from pulp and more specifically to an apparatus which controls the moisture content of pulp discharged from a press.

Known waste material handling systems have included a pulper unit having a tank of water in which a wide range of solid waste materials have been macerated to form a slurry. The slurry of waste material is conducted to a press which removes water from the slurry to form a moist pulp which is discharged to a suitable container. Known systems which include a pulper unit and press are disclosed in U.S. Pat. Nos. 3,188,942; 3,191,872; 3,319,897; and 3,375,776. Various patents have also been obtained on specific water press constructions. Typical of these patents are U.S. Pat. Nos. 3,062,129; 3,426,677 and 3,688,687.

In these known presses, the moisture content of the pulp is controlled within a limited range by a restrictor member or compression cone. The restrictor cone is tightly clamped to a press screw drive shaft. The clamp which secures the cone to the drive shaft can be released to change the position of the restrictor cone along the shaft. This varies the compression which is applied to the pulp to thereby vary the moisture content of the pulp. Thus, if the pulp discharged from a press is too wet, the restrictor cone is adjusted downwardly toward the screw to increase the extent to which it restricts the outlet from the press to thereby increase the compression action applied against the pulp. Similarly, if the pulp which is discharged from the press is too dry, the restrictor cone is moved upwardly to decrease the extent to which it restricts the outlet of the press to thereby reduce the compression action applied against the pulp.

Even though an operator realizes that the position of the restrictor cone should be adjusted to accommodate pulp of different consistencies, most operators are reluctant to adjust the cone. This is because each readjustment of the restrictor cone requires cleaning out of the pulp from around the cone, removing or loosening set screws and handling the cone to position it along the drive shaft. Since the materials which are being processed by the press are waste materials and will frequently carry a foul odor, the idea of handling the material to clear out the restrictor cone and adjust the position of the cone is not attractive to most operators.

It is believed that most operators leave the cone in the position to which it is adjusted at a factory where the press is manufactured. The factory setting for the restrictor cone is sufficiently high to avoid having pulp which is too dry and to avoid overloading the press drive motor. However, when the restrictor cone is at the factory setting, the compressed pulp may contain excess moisture. In many instances, the press operator is not concerned if the pulp is overly damp. However, in order to maximize the operating efficiency of the press, the discharged pulp should have a moisture content of approximately 70%.

Difficulties can arise when an operator moves the restrictor cone downwardly from its factory setting and leaves the cone at the lower setting. This lower setting enables the press to efficiently squeeze water out of short fibered waste materials, such as table napkins and food waste. The difficulties arise when the restrictor cone is left at the lower setting and long fibered materials, such as corrugated boxes, are fed to the pulper and then to the press.

When the higher consistency pulp formed from long fibered waste materials is processed in a press in which the restrictor cone is too low, an overloading of the press drive motor can result. When this happens, the press jams and/or the electrical circuitry is overloaded and a fuse may be blown. When this occurs, it is necessary to clean out hard packed material at the top of the press screw by hand. Since the waste materials which are processed through the press frequently contain waste food and other substances, the hand cleaning of the press is not a particularly pleasant task.

In an effort to maintain the back pressure in a water press within predetermined limits, U.S. Pat. No. 3,394,649 suggests that hydraulic cylinders be provided to move a cylindrical screen relative to a screw. The hydraulic cylinders are activated to move the screen in response to variations in the current required to operate a press drive motor. The movement of the screen varies the press discharge area.

SUMMARY OF THE PRESENT INVENTION

The present invention provides a new and improved method and apparatus for use in controlling the moisture content of pulp of varying consistency being discharged from a press without the problems encountered with prior art presses. This is accomplished by allowing a restrictor member or cone of the press to adjustably move toward and away from the outlet of the press to effect a corresponding change in the area of the outlet during operation of the press. This movement of the restrictor member occurs in response to variations in the consistency of the pulp from which moisture is being removed by the press and results in the compressive forces on the pulp being optimized while the load on a press drive motor is below an overload condition.

To this end, the restrictor member or cone is mounted to the drive shaft of the press screw for movement along the shaft toward and away from the flighting about the screw shaft under the influence of forces applied against the restrictor member by the pulp and other forces applied on the restrictor member, such as the force of gravity. When short fibered paper and food waste pulp is being processed through the press, the relatively low consistency pulp is effective to urge the restrictor member away from the screw flighting and the outlet with a relatively small force. Therefore the restrictor member moves, until the forces on it are balanced, to a new position, increasing the extent to which the area of the outlet from the press is restricted. This increases the compressive force applied to the low consistency pulp to remove the excess water from the pulp.

If relatively long fibered pulp having a high consistency is subsequently processed through the press, the pulp applies an increased force against the restrictor member. This increased force moves the restrictor member away from the screw flighting and the press outlet to thereby reduce the extent to which it restricts the area of the outlet. The resulting reduction in the compressive force applied to the relatively dry, high consistency pulp prevents overloading of the press drive and motor. The self-adjusting action of the restrictor member allows it to change the area of the press outlet in response to variations in the consistencies of the pulp. This results in the compressive force against the pulp and the moisture content of the pulp being maintained substantially constant even though the consistency of the pulp varies during operation of the press.

Accordingly, it is an object of this invention to provide a new and improved method and apparatus to control moisture removal from wet pulp and wherein a restrictor member is moved, in response to variations in pulp consistency, relative to the outlet of a press during operation of the press to vary the extent to which the restrictor member blocks the area of discharge of pulp through the press outlet.

Another object of this invention is to provide a new and improved method and apparatus in accordance with the next preceding object and wherein the restrictor member is moved relative to the press outlet under the influence of forces applied against the restrictor member by the pulp.

Another object of this invention is to provide a new and improved press in which a restrictor member is effective to restrict the passage of pulp through an outlet from the press and wherein the restrictor member is self-adjusting to change the area of the outlet from the press in response to variations in the consistency of the pulp.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS

Figure 1:
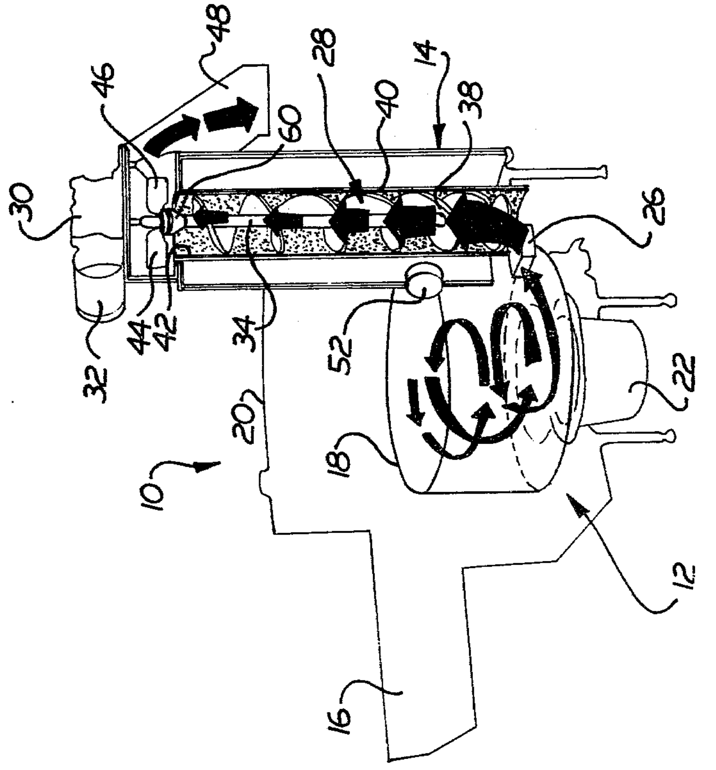
FIG. 1 is a schematic illustration of a waste material handling system having a press which is constructed and operated in accordance with the present invention.

A waste material handling system 10 is illustrated in FIG. 1 and includes a pulper unit 12 which is effective to form a slurry of waste material. This slurry is conducted to a press 14 in which water is removed from the slurry to form a moist pulp. The pulp is discharged to a suitable container (not shown).

During operation of the waste material handling system 10, waste materials are conducted along an input tray 16 to a pulper tank 18 which is disposed within a hood assembly 20. The pulper tank 18 contains water and has a motor 22 which drives a pulper disc (not shown). The pulper disc generates a vortex in the manner indicated schematically by the arrows in FIG. 1. The pulper disc has cutting teeth which macerate the waste material to form a slurry in a manner similar to that disclosed in U.S. Pat. No. 3,599,881. The slurry of waste material is conducted from the pulper tank 18 to an inlet 26 in the bottom portion of the water press 14. The slurry flow path is indicated by the arrows in FIG. 1.

A helical screw 28 is effective to carry the pulp upwardly in the press in a manner which is also indicated schematically by arrows in FIG. 1. The vertical screw 28 (see FIG. 2) is driven through a gear box 30 by an electric drive motor 32. The gear box 30 is connected with a main drive shaft 34 of the screw 28. Operation of the motor 32 is effective to rotate the drive shaft 34 to cause a helical flighting 38 on the screw 28 to lift the pulp in the slurry upwardly in the press.

As the screw 28 moves the pulp upwardly, water is squeezed out of the pulp through a cylindrical screen 40 which extends around the screw 28. The tubular screen 40 is disposed in a coaxial relationship with the screw 28 and its vertical drive shaft 34. The screen 40 has an open lower end portion through which the slurry moves onto the screw 28.

As the semi-dry pulp is lifted through an outlet 42 in the upper end portion of the tubular screen 40 by the screw 28, the pulp is engaged by wiper blades 44 and 46. The blades 44 and 46 rotate with the screw 28 and are effective to push the pulp into a discharge chute 48. The pulp drops from the chute 48 into a suitable container.

The water which is extracted from the pulp in the press 14 flows through the numerous openings in tubular screen 40 to the bottom of the press. This water then flows to the pulper tank 18 through a return water outlet 52 to thereby enable the water which is removed from the pulp to be reused. The general construction and mode of operation of the waste material handling system 10 is well known and will not be further described herein.

In accordance with a feature of the present invention, an apparatus 56 is provided to control the moisture content of the pulp which is discharged from the press 14. The apparatus 56 includes a restrictor member or cone 60 (see FIG. 3). The restrictor cone 60 is movably mounted along the shaft 34 for self-adjustment of its position relative to the screen outlet 42. That is, during operation of the press 14, the cone 60 may move to vary the extent to which it blocks the discharge of pulp from the screen 40 through its upper outlet 42. More particularly, the restrictor cone 60 is movable axially along the vertical shaft 34 between the lowered position shown in FIG. 3 and the raised position shown in FIG. 6.

The restrictor cone 60 adjustably moves from the lowered position (FIG. 3) toward the raised position (FIG. 6) under the influence of forces, applied against a conical outer surface 64 of the cone, by the pulp. Thus, wet pulp is disposed in the tubular screen 40 between the upper end of the screw 28 and the outlet 42 from the screen. Operation of the screw 28 presses the wet pulp against the surface 64 of the cone. The forces applied against the surface of the cone 60 cause the cone to slide upwardly on the drive shaft 34. The corresponding forces against the wet pulp compresses the pulp to squeeze water out of the pulp.

In this embodiment of the invention, the cone moves downwardly from the raised position (FIG. 6) to the lowered position (FIG. 3) under the influence of gravity. Thus, when the pressure of the pulp against the outer surface 64 of the cone decreases during operation of the press, the cone slides downwardly along the shaft toward the position shown in FIG. 3.

During operation of the press 14, the restrictor cone 60 moves axially along the drive shaft 34 in response to variations in the consistency of the pulp to control the compressive force applied against the pulp. This maintains the moisture content of the pulp constant at approximately 70% even though the characteristics of the wet pulp may vary. Thus, with pulp having a relatively low consistency, such as pulp made from short fibered paper and food waste, the cone 60 moves down the vertical drive shaft 34 toward the position shown in FIG. 3 to increase the extent to which it restricts the screen outlet 42 of the press 14. This results in the wet pulp being compressed and pushed out in the relatively small amount of space between the conical outer surface 64 of the cone 60 and the uppermost convolution of the helical screw 28.

Figure 6:
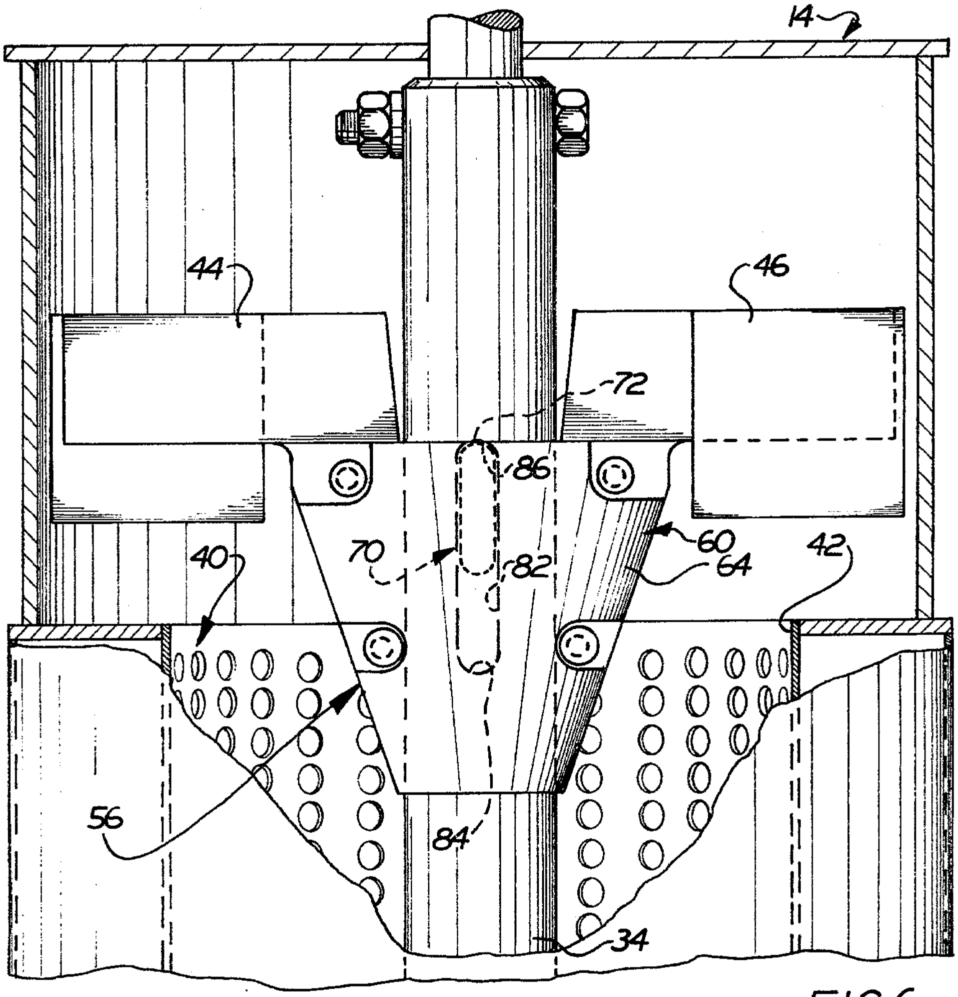
FIG. 6 is a fragmentary sectional view, generally similar to FIG. 3, illustrating the restrictor member or cone in a raised position in which the restricting action of the cone is minimized.

Similarly, when a relatively high consistency pulp, such as pulp formed from long fibered paper, is being processed, the cone 60 moves up the vertical drive shaft 34 towards the position shown in FIG. 6. This decreases the extent to which the cone restricts the outlet from the press 14. Therefore the space in which the relatively dry pulp is compressed and pushed out is larger than the space in which the relatively wet pulp is compressed and pushed out. However, the compressive force applied against the pulp remains relatively constant since the cone is continuously urged downwardly under the constant biasing force of gravity.

Since the movement of the restrictor member or cone 60 during operation of the press is effective to maintain the compressive forces on the pulp substantially constant, the moisture content of the pulp discharged from the press is maintained substantially constant. Thus the moisture content of the discharged pulp is maintained constant even though the consistency of the pulp may vary during operation of the press. The compressive forces on the pulp are thus optimized with the load on the press drive motor being maintained substantially constant to prevent overloading of the drive motor. In addition, maintaining the moisture content of the discharged pulp substantially constant, for example at 70%, promotes efficient press operation.

Figure 3:
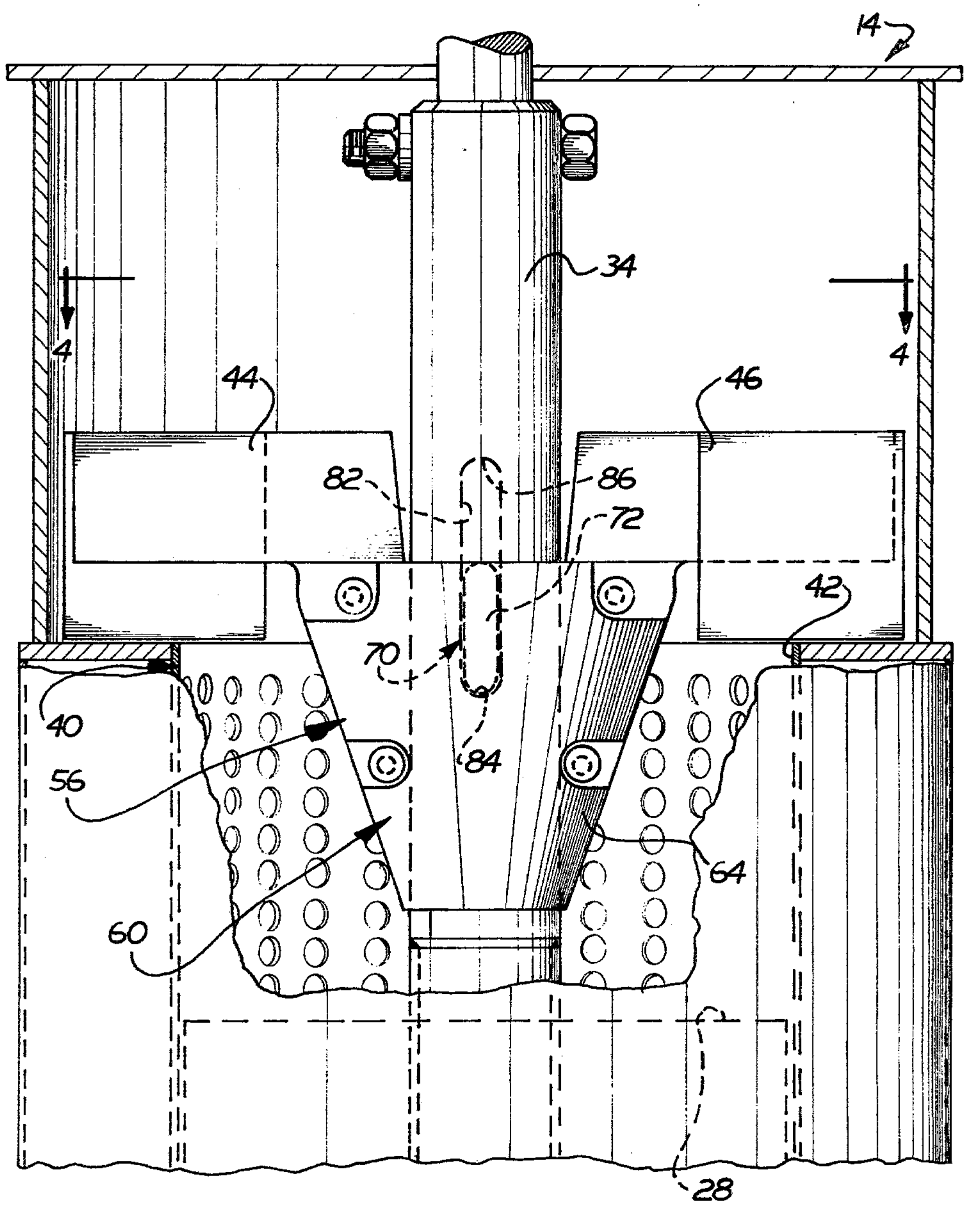
FIG. 3 is an enlarged fragmentary sectional view of a portion of the press of FIG. 2 and illustrating the restrictor member or cone in a lowered position in which the restricting action of the cone is maximized.
Figure 4:
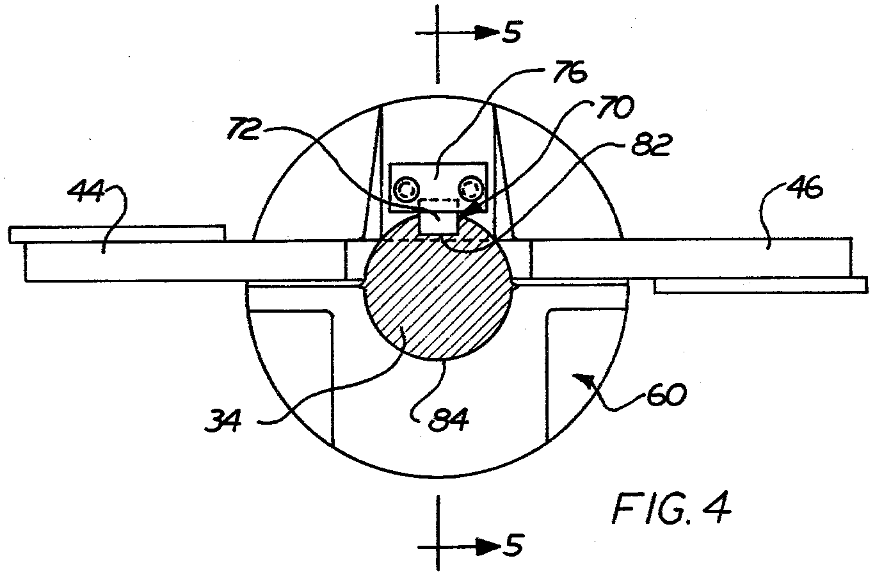
FIG. 4 is a sectional view, taken along the line 4—4 of FIG. 3, illustrating an assembly for slidably connecting the restrictor member or cone with a drive shaft for the press.
Figure 5:
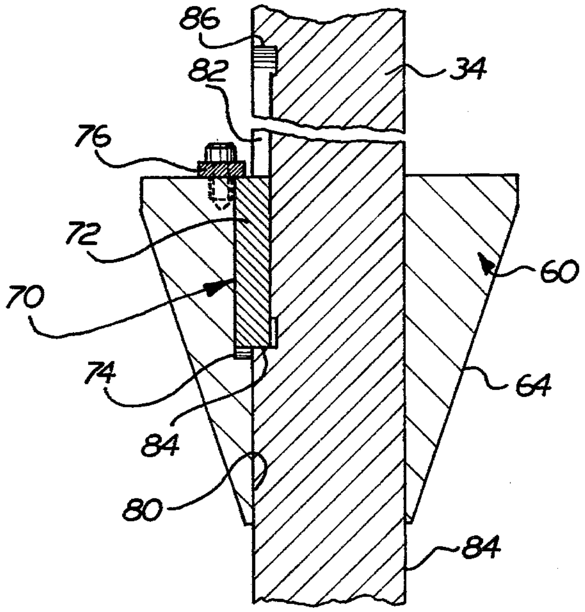
FIG. 5 is a sectional view, taken along the line 5—5 of FIG. 4, further illustrating the manner in which the restrictor member or cone is slidably connected with the drive shaft.

The restrictor cone is connected with the screw drive shaft 34 by a connector assembly 70 (FIGS. 3, 4 and 5). The connector assembly 70 performs the dual functions of connecting the cone 60 to drive shaft 34 for rotation therewith and allowing the cone to freely move axially along the drive shaft during operation of the press. Thus, the connector assembly 70 includes a key 72 which is held in place in a recess 74 (see FIG. 5) in the cone 60 by a retaining member 76. The key or connector member 72 extends radially inwardly of a cylindrical inner bore 80 of the cone 60 into a straight vertical keyway or groove 82 formed in the drive shaft 34 (see FIGS. 4 and 5).

The key 72, keyway 82 and bore 80 are sized so as to enable the cone 60 to freely slide vertically along the shaft 34 toward and away from the screw 28. This translational movement of the cone 60 is guided by the cylindrical inner surface 80 of the cone which is disposed in sliding engagement with the cylindrical outer surface 84 of the shaft 34. The key 72 cooperates with the keyway 82 to prevent rotational movement of the cone 60 relative to the drive shaft 34. In addition, the key 72 cooperates with the shoulders or stops 84, 86 defined at the upper and lower ends of the keyway 82 to limit upward and downward translational movement of the cone 60.

The wiper blades 44 and 46 are connected with the restrictor cone 60 (see FIGS. 3 and 4). Therefore when the drive shaft 34 is rotated by the motor 32 (see FIG. 2), the connector assembly 70 is effective to rotate the cone 60 and the wiper blades 44 and 46 with the shaft.

Although the connector assembly 70 holds the restrictor cone 60 against rotational movement relative to the drive shaft 34, the connector assembly is ineffective to hold the cone against vertical movement relative to the shaft. Therefore, the force of the pulp against the conical surface 64 of the restrictor member 60 is effective to push against and overcome the restrictor member weight and frictional forces on the shaft and move the member upwardly along the vertical shaft 34.

When the consistency of the pulp is reduced, the weight of the cone 60 is effective to move it downwardly along the shaft 34 under the influence of gravity to balance the forces from the pulp. In order to promote this free movement of the cone 60 along the shaft 34, the corners on the key 72 have been rounded off (see FIGS. 3 and 5) so as to promote a sliding action between the key 72 and the keyway 82. Although it contemplated that the cone could have many different weights and shapes and could be formed of many different materials, in one specific instance the cone was formed of manganese bronze and had a weight of approximately 14 lbs.

Although it is preferred to move the cone downwardly under the biasing influence of gravity, it is contemplated that under certain circumstances, it may be desirable to provide an additional biasing force which urges the cone downwardly. Thus, in the embodiment of the invention shown in FIG. 7, the downward biasing force of gravity is supplemented by a spring biasing force. Since the embodiment of the invention shown in FIG. 7 is generally similar to the embodiment of the invention shown in FIGS. 2–6, similar numerals will be utilized to designate similar components, the suffix letter "a" being associated with the components of FIG. 7 in order to avoid confusion.

Figure 2:
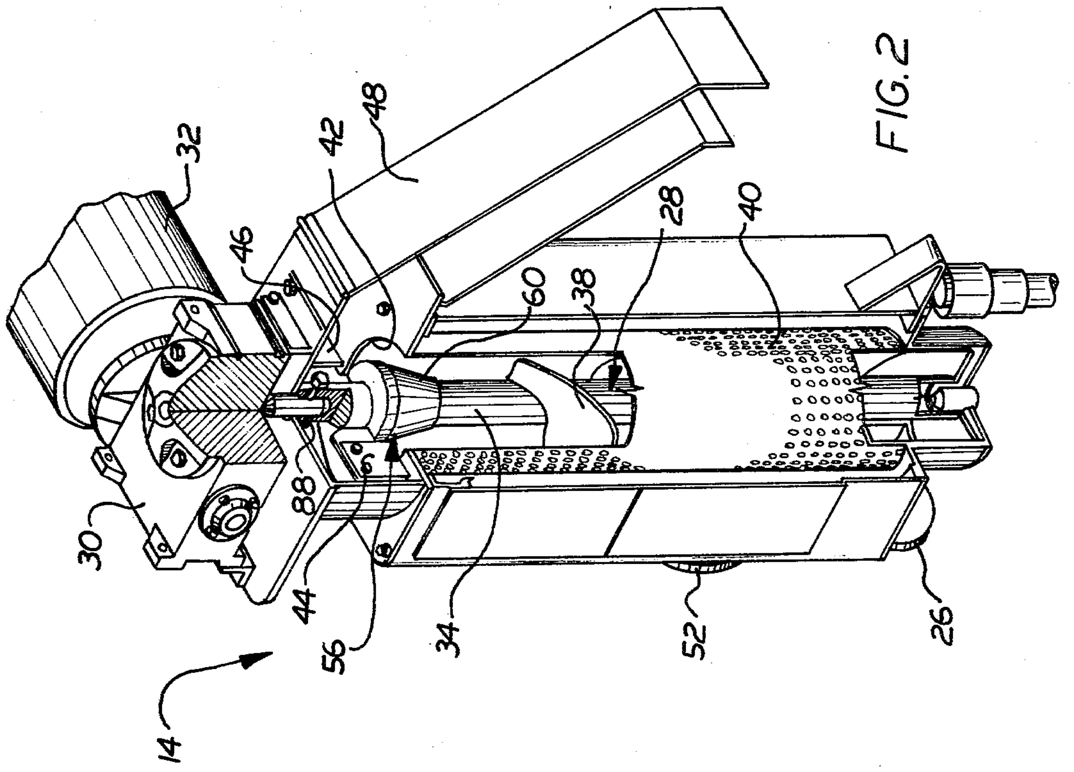
FIG. 2 is an enlarged fragmentary view of the press utilized in the apparatus of FIG. 1.

The press **14*a* has a tubular cylindrical screen 40*a* which surrounds a screw (not shown) having a construction similar to the screw 28 of FIG. 2. During operation of the press 14*a*, a vertical drive shaft 34*a* is effective to rotate the screw and a restrictor member or cone 60*a* about a longitudinally extending central axis of the screen 40*a*. As this occurs, a pair of wiper blades 44*a* and 46*a* are rotated with the cone 60*a* to force semi-dry pulp out of the press 14*a***.

Figure 7:
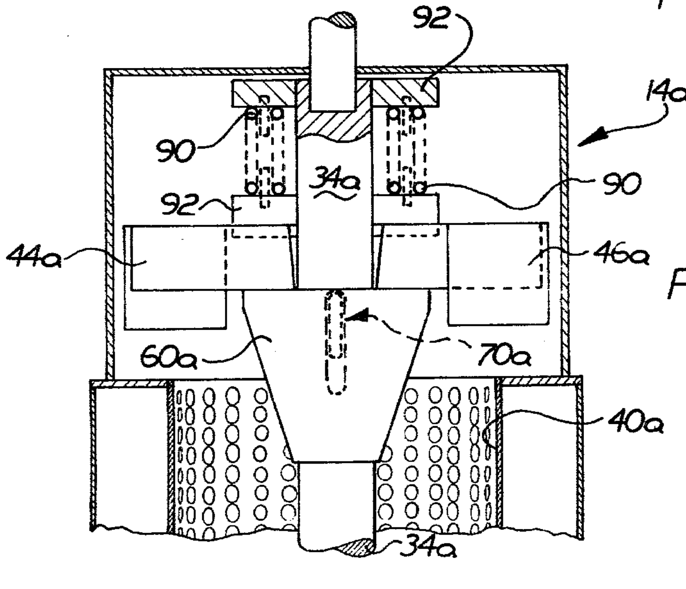
FIG. 7 is a schematic sectional view, generally similar to FIG. 3, of an embodiment of the invention in which the restrictor member or cone is urged downwardly under the influence of a plurality of springs.

In accordance with a feature of the embodiment of the invention illustrated in FIG. 7, the restrictor cone **60*a* is urged downwardly under the combined influence of gravity and a plurality of springs 90. The springs 90 extend between upper and lower mounting plates or rings 92. The upper ring 92 is connected with the vertical drive shaft 34*a* for rotation therewith and the lower ring 92 is interfitted with and rests upon the wiper blades 44*a* and 46*a* for rotation therewith and is slidable axially along the shaft 34*a*. The springs 90 exert a continuous downward force against the wiper blades to urge the cone 60*a* downwardly against the pulp on the upper convolution of the screw. It should be noted that a connector assembly 70*a* connects the cone to the drive shaft for rotation therewith and allows the cone to move vertically along the drive shaft. Although the connector assembly 70***a* is illustrated in FIG. 7 as having a key and slot construction, it is contemplated that different types of connector assemblies could be utilized if desired. Also, one spring coaxially mounted about the shaft 34*a* could be used instead of two springs.

In view of the foregoing description it is apparent that the present invention provides a new and improved method and apparatus for use in controlling the moisture content of pulp discharged from a press 10. This is accomplished by allowing a restrictor member or cone 60 to move toward and away from the outlet 42 of the press 10 to effect a corresponding change in the area of the outlet during operation of the press. This movement occurs automatically in response to variations in the consistency of the pulp from which moisture is being removed by the press. This results in the compressive forces on the pulp being optimized while load on a press drive motor 32 is maintained below an overload condition.

To this end, the restrictor member or cone 60 is moved along the screw drive shaft 34 under the influence of forces applied against the restrictor member by the pulp. When short fibered paper and food waste pulp are being processed through the press, the relatively low consistency pulp is effective to urge the restrictor member upwardly with a relatively small force. Therefore the restrictor member 60 moves to a position increasing the extent to which the outlet 42 from the press 10 is restricted. This increases the compressive forces applied to the low consistency pulp.

If relatively long fibered pulp is subsequently processed through the press, the relatively high consistency pulp applies an increased force against the restrictor member 60. This increased force moves the restrictor member 60 away from the press outlet 42 to thereby reduce the extent to which it restricts the outlet. The self-adjusting action of the restrictor member allows it to change the area of the press outlet 42 in response to variations in the consistencies of the pulp. This results in the compressive force against the pulp and the moisture content of the pulp being maintained substantially constant even though the consistency of the pulp varies during operation of the press.

Having described specific preferred embodiments of the invention, the following is claimed:

1. In a press for extracting fluid from a slurry of solids and including an elongated tubular member having a lower slurry inlet and an upper solids outlet, a plurality of openings defined in said tubular member for passage of extracted fluid to the exterior of said tubular member, conveyor means disposed within said tubular member, power means for operating said conveyor means to cause lifting of solids in said slurry from said lower inlet toward said upper outlet of said tubular member and a compression member disposed adjacent said upper outlet so as to restrict passage therethrough of solids being lifted by said conveyor means and thereby engage and cause compressive force to be exerted on the solids within said tubular member which results in extraction of fluid therefrom through said openings in said tubular member before discharge of the solids through said upper outlet, the improvement which comprises:

means mounting said compression member for self-adjusting movement toward and away from said upper outlet of said tubular member, which correspondingly changes the area of said upper outlet, in response to variations in the consistency of the solids of the slurry, whereby the compressive force on the solids within said tubular member is optimized while the load on said power means is maintained below overload condition.

2. The press as recited in claim 1, wherein:

said conveyor means is a screw mounted for rotation within said tubular member and is rotated by said power means; and said mounting means mounts said compression member for rotational movement with said screw and for translatory movement toward and away from said screw and said upper outlet of said tubular membe during its rotation with said screw.

3. The press as recited in claim 1, wherein:

said conveyor means is a screw having an elongated central shaft and helical flighting mounted around said shaft, said screw shaft including an upper end portion which extends beyond an upper end of said flighting;

said compression member has a central bore through which said upper end portion of said screw shaft is received thereby mounting said compression member on said shaft end portion adjacent said upper end of said flighting; and said mounting means comprises interfitting elements on said shaft end portion and on said compression member which limit said compression member relative to said shaft to translatory movement along said shaft end portion.

4. The press as recited in claim 3, wherein said interfitting elements include at least one keyway defined within and along said shaft end portion and at least one key mounted on said compression member so as to project into said keyway of said shaft end portion, said keyway and key being respectively configured in cross-section so as to allow sliding movement of said key along said keyway.

5. In a press for extracting fluid from a slurry of solids and including an elongated tubular screen having a lower slurry inlet and an upper solids outlet, a plurality of openings defined in said screen for passage of extracted fluid to the exterior of said screen, a screw disposed within said screen and having an elongated central shaft and helical flighting mounted around said shaft, power means for rotating said shaft of said screw and said flighting therewith relative to said screen to cause lifting of solids in said slurry from said lower inlet toward said upper outlet and a compression member aligned with said screw shaft and disposed adjacent and aligned with said upper outlet of said screen so as to restrict passage therethrough of solids being lifted by said screw and thereby engage and cause compressive force to be exerted on the solids within said screen which results in extraction of fluid therefrom through said screen openings before discharge of the solids through said upper screen outlet, the improvement which comprises:

means mounting said compression member for rotational movement with said screw and for self-adjusting movement toward and away from said upper screen outlet, as said compression member rotates with said screw, which correspondingly changes the area of said outlet and thereby regulates the compressive force on the solids within said screen such that the load on said power means is maintained below overload condition.

6. In a press for extracting fluid from a slurry of solids and including an elongated tubular screen having a lower slurry inlet and an upper solids outlet, a plurality of openings defined in said screen for passage of extracted fluid to the exterior of said screen, a screw disposed within said screen and having an elongated central shaft and helical flighting mounted around said shaft with an upper end portion of said shaft extending beyond an upper end of said flighting, power means for rotating said shaft of said screw and said flighting therewith relative to said screen to cause lifting of solids in said slurry from said lower inlet toward said upper outlet and a compression cone having a central bore which receives said upper end portion of said screw shaft for disposing said cone adjacent said upper end of said flighting and adjacent said upper outlet of said screen so as to restrict passage therethrough of solids being lifted by said screw and thereby engage and cause compressive force to be exerted on the solids within said screen which results in extraction of fluid therefrom through said screen openings before discharge of the solids through said upper outlet, the improvement which comprises:

interfitting elements defined respectively on said cone and said shaft so as to mount said compression cone on said upper end portion of said screw shaft for rotational movement with said shaft and for translatory movement relative to said shaft toward and away from said upper end of said screw flighting and said upper screen outlet during rotation of said cone with said shaft.

7. The press as defined in claim 6, wherein said interfitting elements define a stop for limiting movement of said cone toward said screw flighting to a position in which substantially all of said cone is disposed within said screen adjacent its upper outlet.

8. The press as defined in claim 6, wherein said interfitting elements include at least one keyway formed within and along said upper shaft end portion and at least one key mounted on said cone so as to project within said central bore of said cone and into said keyway of said shaft end portion, said keyway and key being respectively configured in cross-section so as to allow sliding movement of said key along said shaft end portion while preventing rotation of said shaft relative to said cone.

9. An apparatus for use in removing moisture from wet pulp, said apparatus comprising a press having a rotatable shaft and a screw connected with said shaft, means for operating said press to discharge pulp from which moisture has been removed, said means for operating said press including means for rotating said screw and shaft, and control means for use in controlling the moisture content of the pulp discharged from said press, said control means including a restrictor member extending outwardly from said shaft to restrict the discharge of pulp from said press and connector means for connecting said restrictor member with said shaft for rotation therewith and for enabling said restrictor member to move axially along said shaft during operation of said press to vary the extent to which said restrictor member blocks the discharge of pulp from said press.

10. An apparatus as set forth in claim 9 wherein said connector means includes surface means for defining a longitudinally extending groove and a connector member at least partially disposed in said groove, said connector member and surface means being relatively movable to enable the position of said restrictor member relative to said shaft to be varied during operation of said press.

11. An apparatus as set forth in claim 9 wherein said restrictor member has surface means for cooperating with said screw to apply compressive forces against the pulp, said connector means being effective to enable said restrictor member to move along said shaft under the influence of forces applied to said surface means by the pulp.

12. An apparatus as set forth in claim 9 wherein said restrictor member is movable in a first direction along said shaft under the influence of forces applied against said restrictor member by the pulp during rotation of said screw and shaft, said restrictor member being movable in a second direction along said shaft under the influence of gravity and against the influence of forces applied against said restrictor member by the pulp during operation of said press.

13. An apparatus as set forth in claim 9 wherein said restrictor member is movable in a first direction along said shaft under the influence of forces applied against said restrictor member by the pulp during operation of said press, said apparatus further including spring means for urging said restrictor member in a second direction along said shaft against the influence of forces applied against said restrictor member by the pulp.

14. An apparatus comprising press means for removing moisture from wet pulp, said press means having an inlet through which wet pulp is supplied to said press means and an outlet through which pulp from which moisture has been removed is discharged from said press means, means for restricting the discharge of pulp from said press means, said means for restricting the discharge of pulp from said press means including a restrictor member disposed adjacent to the outlet through which pulp is discharged, said restrictor member having a surface against which the pulp applies pressure, and means for enabling said restrictor member to move relative to said press means under the influence of the pressure applied against said surface by the pulp during operation of said press means.

15. An apparatus as set forth in claim 14 wherein said restrictor member is movable from a first position to a second position to reduce the extent to which said restrictor member restricts the discharge of pulp from said press means, biasing means for continuously urging said restrictor member toward the first position, said restrictor member being movable from the first position to the second position against the influence of said biasing means under the influence of the pressure applied against said surface during operation of said press means.

16. An apparatus as set forth in claim 14 wherein said means for enabling said restrictor member to move relative to said press means includes a longitudinally extending groove and a connector member extending into said groove.

17. An apparatus as set forth in claim 14 wherein said press means includes a screw and a tube which circumscribes the screw, said restrictor member being disposed adjacent to the one end portion of said screw and being effective to restrict movement of pulp out of said tube.

18. An apparatus as set forth in claim 17 wherein said means for enabling said restrictor member to move relative to said press means includes guide means for guiding movement of said restrictor member along a longitudinal central axis of said screw.

19. A method comprising the steps of feeding wet pulp to a press, restricting the discharge of pulp from the press with a restrictor member, operating the press to move the pulp toward the restrictor member, applying force against the restrictor member with the pulp as the pulp is moved by the press, and varying the extent to which the restrictor member restricts the discharge of pulp by moving the restrictor member relative to the press under the influence of the forces applied against the restrictor member by the pulp during operation of the press.

20. A method as set forth in claim 19 wherein said step of moving the restrictor member includes the step of reducing the extent to which the restrictor member restricts the discharge of pulp.

21. A method as set forth in claim 19 wherein said step of moving the restrictor member under the influence of the forces applied against the restrictor member by the pulp includes the step of moving the restrictor member in a first direction relative to the press, said step of varying the extent to which the restrictor member restricts the discharge of pulp further includes the step of moving the restrictor member in a second direction opposite to the first direction under the influence of gravity.

22. A method as set forth in claim 19 wherein said step of feeding wet pulp to a press includes the step of feeding wet pulp having a first consistency to the press, said step of moving the restrictor member includes the step of moving the restrictor member to a first position under the influence of forces applied against the restrictor member by the pulp having a first consistency, said step of feeding wet pulp to the press further includes the step of feeding wet pulp having a second consistency to the press, said step of moving the restrictor member further includes the step of moving the restrictor member to a second position under the influence of forces applied against the restrictor member by the pulp having a second consistency.

23. A method as set forth in claim 19 wherein said step of operating the press includes the step of rotating a screw about its longitudinal central axis, said step of moving the restrictor relative to the press includes moving the restrictor member along the longitudinal central axis of the screw.

24. A method comprising the steps of providing a press having an inlet through which pulp is fed to a rotatable screw and an outlet through which pulp is discharged, feeding wet pulp to the inlet to the press, operating the press to remove moisture from the wet pulp and to discharge pulp from which moisture has been removed, said step of operating the press includes the step of rotating the screw about a longitudinal axis, and controlling the moisture content of the discharged pulp by varying the extent to which the outlet of the press is restricted during operation of the press, said step of varying the extent to which the outlet of the press is restricted includes the step of moving a restrictor member along the axis about which the screw rotates during operation of the press.

* * * * *